(12) United States Patent
Narula et al.

(10) Patent No.: US 11,503,525 B2
(45) Date of Patent: Nov. 15, 2022

(54) METHOD FOR ADAPTIVE LINK PERSISTENCE IN INTELLIGENT CONNECTIVITY

(71) Applicant: Dell Products L.P., Round Rock, TX (US)

(72) Inventors: Harpreet S. Narula, Austin, TX (US); Vivek Viswanathan Iyer, Austin, TX (US); Minho Cheong, Round Rock, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 17/133,511

(22) Filed: Dec. 23, 2020

(65) Prior Publication Data
US 2022/0201577 A1 Jun. 23, 2022

(51) Int. Cl.
*H04W 4/00* (2018.01)
*H04W 36/14* (2009.01)
(Continued)

(52) U.S. Cl.
CPC ....... *H04W 36/14* (2013.01); *H04W 36/0027* (2013.01); *H04W 36/22* (2013.01);
(Continued)

(58) Field of Classification Search
CPC ........... H04W 84/12; H04W 36/00837; H04W 36/0085; H04W 36/0094; H04W 36/00; H04W 36/0005; H04W 36/0016; H04W 88/06; H04W 36/14; H04W 36/0027; H04W 36/22; H04W 36/30; H04W 48/18; H04L 47/805; H04L 5/006; H04L 5/0058
(Continued)

(56) References Cited

U.S. PATENT DOCUMENTS

| 2014/0003261 A1 | 1/2014 | Gillett et al. |
| 2018/0160441 A1* | 6/2018 | Egner ............... H04W 72/1215 |
| 2018/0167861 A1 | 6/2018 | Kavoussi |

FOREIGN PATENT DOCUMENTS

| WO | WO 2005036901 A1 | 4/2005 |
| WO | WO2014043500 A1 | 3/2014 |

(Continued)

OTHER PUBLICATIONS

International Search Report and Written Opinion for PCT Application No. PCT/US2021/029804, dated Sep. 23, 2021.

*Primary Examiner* — Huy C Ho
(74) *Attorney, Agent, or Firm* — Terrile, Cannatti & Chambers; Stephen A. Terrile

(57) ABSTRACT

A system, method, and computer-readable medium are disclosed for performing a connectivity handover operation. The connectivity handover operation includes: identifying a Wireless Wide Area Network (WWAN) link, the WWAN link having an associated WWAN location quality identifier; identifying a Wireless Local Area Network (WLAN) link, the WLAN link having an associated WLAN location quality identifier; monitoring the associated WWAN location quality identifier and the associated WLAN location quality indicator; determining whether the WWAN link should be activated based upon the associated WLAN location quality identifier; and, performing the connectivity handover operation based upon the determining.

20 Claims, 10 Drawing Sheets

(51) Int. Cl.
    *H04W 36/00*     (2009.01)
    *H04W 36/22*     (2009.01)
    *H04W 36/30*     (2009.01)
    *H04W 48/18*     (2009.01)
    *H04W 84/12*     (2009.01)
    *H04W 88/06*     (2009.01)

(52) U.S. Cl.
    CPC ........... *H04W 36/30* (2013.01); *H04W 48/18* (2013.01); *H04W 84/12* (2013.01); *H04W 88/06* (2013.01)

(58) Field of Classification Search
    USPC ........................................................ 370/331
    See application file for complete search history.

(56) References Cited

FOREIGN PATENT DOCUMENTS

| WO | WO 2016160230 A1 | 10/2016 |
|----|------------------|---------|
| WO | WO 2019177931 A1 | 9/2019 |

\* cited by examiner

| User Device Context 602 | Inputs To Handover Decision Engine 612 ||||  Outputs From Handover Decision Engine 622 ||
|---|---|---|---|---|---|---|
| | Battery State 614 | Motion Detection 616 | WLAN Link Quality 618 | WWAN Link Quality 620 | WLAN Traffic 624 | WWAN Traffic 626 |
| Videoconferencing | High | Yes | Poor | Good | No | Yes - Seamless Handover To WWAN |
| Gaming, Audio Chat | High | Yes | Poor | Good | No | Yes - Seamless Handover To WWAN |
| Videoconferencing, Cloud Storage Update, Audio Chat | High | Yes | Poor | Good | Cloud Storage Update | Videoconferencing, Audio Chat - Seamless Handover To WWAN |
| Gaming, Audio Chat | Low | Yes | Good | Good | Gaming, Audio Chat | No |
| Videoconferencing | Low | Yes | Poor | Good | No | Videoconferencing |
| Videoconferencing, Cloud Storage Update, Audio Chat | Low | Yes | Good | Poor | Videoconferencing, Cloud Storage Update, Audio Chat | No |
| Videoconferencing, Cloud Storage Update, Audio Chat | Low | No | Poor | Good | No | Videoconferencing, Cloud Storage Update, Audio Chat |

*Figure 6*

| Network Link Application 902 | Application Category 904 | Multi-Link Redundancy Decision 906 |
|---|---|---|
| Uncorded (UC) voice communications with built-in packet resilience | 1. Real-time, low latency, and inherent resiliency | Category 1 – No multi-link redundancy |
| Wireless docking Media Agnostic USB (MA-USB) over WiFi | 2. Real-time, critical to user experience, no built-in resiliency | Category 2 – multi-link redundancy with choice of real-time variable channel redundancy methods, as function of packet loss |
| Near Field Communications (NFC) over WiFi of sideband | 3. Delayed real-time, but critical to user experience, no built-in resiliency | Category 3 – multi-link redundancy with robust delayed real-time variable channel redundancy methods, as function of packet loss |

Figure 9

| Application Category 904 | Scoring Threshold (1-100) 1006 | Hysteresis Period 1008 |
|---|---|---|
| 1 | N/A | N/A |
| 2 | 30 | 30 Seconds |
| 3 | 20 | 180 Seconds |
| ... | ... | ... |

Figure 10

| Use Case 1102 | Input: Interval Between Packet Bursts 1104 | Input: Interval Between Packets And Any Acks 1106 | Output: Category Classification 1108 | Output: Channel Redundancy Classification 1110 |
|---|---|---|---|---|
| Low-Latency P2P Gaming | Consistent with minimal standard development (indicating steady-state fps type traffic for low latency gaming) | No Acks (possible UDP traffic due to low latency) | Category 1 (no multi-link redundancy) | None |
| Wireless Docking | Sporadic and correlated to user activity (can be correlated on platform side | Low latency between requests and responses | Category 2 (multi-links that are redundant) | Choice of real-time variable channel redundancy methods, as function of packet loss |
| P2P Control Operations | Sporadic and correlated to user activity (can be correlated on platform side | Moderate latency between requests and responses | Category 3 (multi-links that are redundant) | Robust delayed real-time variable channel redundancy methods, as function of packet loss |

Figure 11

METHOD FOR ADAPTIVE LINK PERSISTENCE IN INTELLIGENT CONNECTIVITY

BACKGROUND OF THE INVENTION

Field of the Invention

The present invention relates to information handling systems. More specifically, embodiments of the invention relate to performing a network traffic routing operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a connectivity handover operation, comprising: identifying a Wireless Wide Area Network (WWAN) link, the WWAN link having an associated WWAN location quality identifier; identifying a Wireless Local Area Network (WLAN) link, the WLAN link having an associated WLAN location quality identifier; monitoring the associated WWAN location quality identifier and the associated WLAN location quality indicator; determining whether the WWAN link should be activated based upon the associated WLAN location quality identifier; and, performing the connectivity handover operation based upon the determining.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a Wireless Wide Area Network (WWAN) link, the WWAN link having an associated WWAN location quality identifier; identifying a Wireless Local Area Network (WLAN) link, the WLAN link having an associated WLAN location quality identifier; monitoring the associated WWAN location quality identifier and the associated WLAN location quality indicator; determining whether the WWAN link should be activated based upon the associated WLAN location quality identifier; and, performing the connectivity handover operation based upon the determining.

In another embodiment the invention relates to a computer-readable storage medium embodying computer program code, the computer program code comprising computer executable instructions configured for: identifying a Wireless Wide Area Network (WWAN) link, the WWAN link having an associated WWAN location quality identifier; identifying a Wireless Local Area Network (WLAN) link, the WLAN link having an associated WLAN location quality identifier; monitoring the associated WWAN location quality identifier and the associated WLAN location quality indicator; determining whether the WWAN link should be activated based upon the associated WLAN location quality identifier; and, performing the connectivity handover operation based upon the determining.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 6 shows a table of example user device contexts and associated inputs used to generate corresponding network traffic handover decision outputs;

FIG. 9 shows a table of example multi-link redundancy decisions corresponding to certain network link applications and their associated application categories;

FIG. 10 shows a table of example scoring thresholds and associated hysteresis periods corresponding to certain application categories;

FIG. 11 shows a table of example input attributes and associated output classifications corresponding to certain seamless connectivity handover use cases.

DETAILED DESCRIPTION

Figure 1:
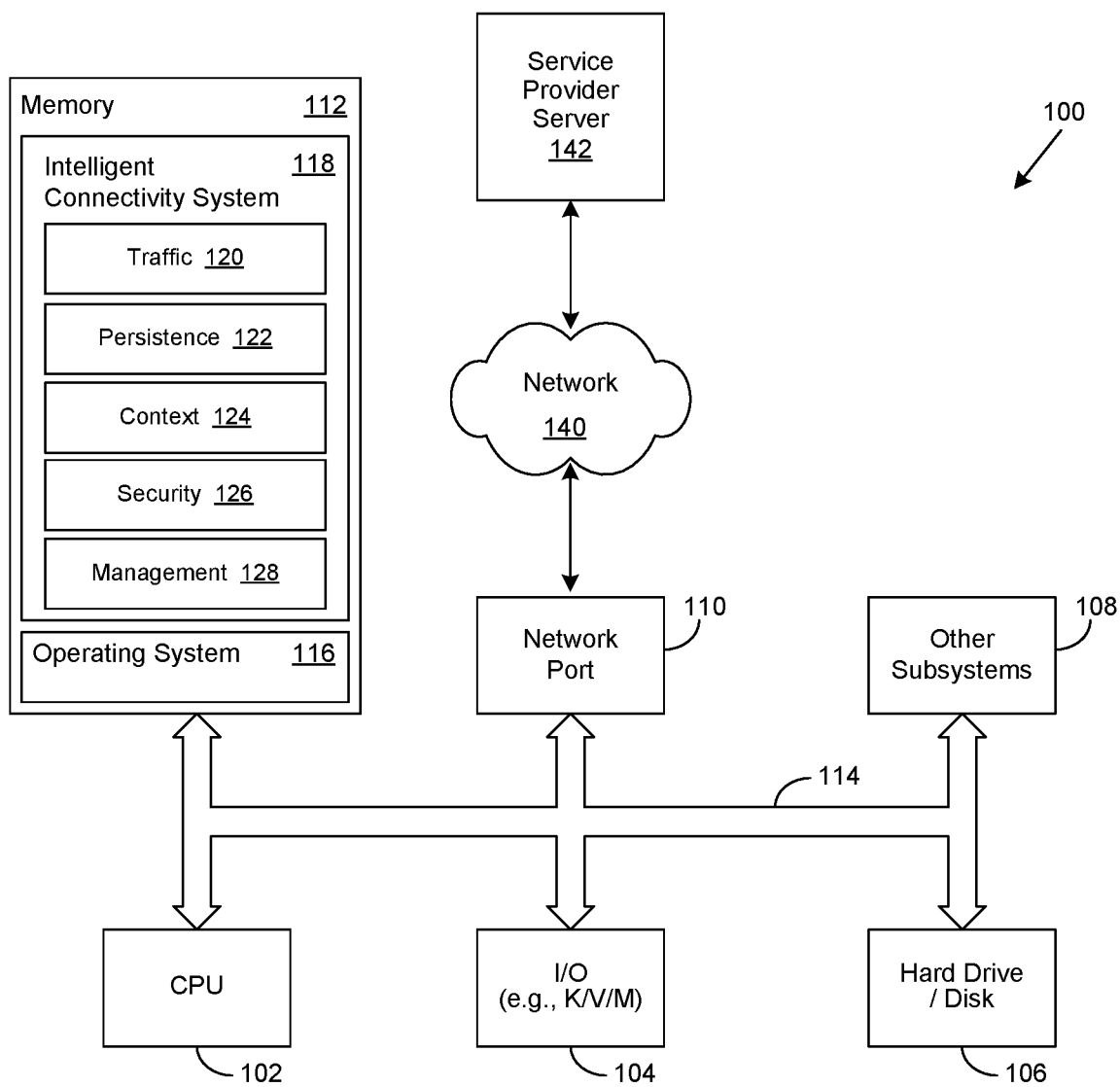
FIG. 1 shows a general illustration of components of an information handling system as implemented in the system and method of the present invention.

A system, method, and computer-readable medium are disclosed for performing a network traffic routing operation. Certain aspects of the invention reflect an appreciation that there is an increasing need to efficiently get data from where it may be stored or generated to where it is needed, whether that be in a data center, in the cloud, on the network edge, or a combination thereof. Certain aspects of the invention likewise reflect an appreciation that there is a growing proliferation of network-enabled devices and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of network connectivity wherever and whenever needed. Certain aspects of the invention reflect an appreciation that users have likewise come to expect network connectivity, regardless of the underlying technology used to provide it, to be seamless, reliable, and secure.

Certain aspects of the invention reflect an appreciation that various approaches are known for handing off network traffic from a WLAN to a WWAN, or vice-versa. However, such approaches are typically based upon the quality of the connection to the WLAN instead of the quality of the connection to the WWAN. As an example, a mobile device may be connected to a WiFi network. In this example, the quality of the WiFi connection may decrease as the mobile device moves further away from the WiFi access point. To continue the example, the mobile device may be configured to connect to a WWAN, such as a particular 4G cellular network, once the quality of the WiFi connection decreases to a predetermined level. However, the quality of the resulting connection to the WWAN may in fact be poorer than the previously-used WiFi connection, and in some cases, may be of insufficient quality for certain uses. As a result, the mobile device may attempt to reconnect to the WiFi network, which may incur a delay, such as five to ten seconds, before network connectivity can be reestablished.

Certain aspects of the invention likewise reflect an appreciation that the presence of network connectivity may be miss-detected from time to time. As a result, the delay incurred when switching back from a WLAN connection to a WWAN connection, and then right back to the WLAN connection, or vice-versa, may be as much as doubled (e.g., ten to twenty seconds) due to associated connection calibration procedures. Accordingly, even if the probability of network connectivity miss-detection only occurs five percent of the time, an average delay of one second would be added to the performance of all handoff events.

Likewise, certain aspects of the invention reflect an appreciation that a mobile device may be configured to detect the presence of WWAN connectivity availability only after there is no longer any WLAN signal at all. Certain aspects of the invention likewise reflect an appreciation that the ability to detect the presence of WWAN connectivity availability prior to completely losing a WLAN signal can be advantageous. Certain aspects of the invention reflect an appreciation that is may likewise be advantageous to the user of a mobile device if the respective connectivity of a WLAN and WWAN can be combined. For example, the ratio of traffic allocated to each network connection may be allocated according to certain network connectivity quality metrics, such as latency, throughput, coverage, and so forth.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an intelligent connectivity system 118. In one embodiment, the information handling system 100 is able to download the intelligent connectivity system 118 from the service provider server 142. In another embodiment, the intelligent connectivity system 118 is provided as a service from the service provider server 142.

In certain embodiments, the intelligent connectivity system 118 may be implemented to include a traffic component 120, a persistence component 122, a context component 124, a security component 126, and a management component 128, or a combination thereof, as described in greater detail herein. In certain embodiments, the intelligent connectivity system 118 may be implemented to perform an intelligent connectivity operation, described in greater detail herein. In certain embodiments, the intelligent connectivity operation may be performed by the intelligent connectivity system 118 during operation of an information handling system 100. In certain embodiments, the performance of the intelligent connectivity operation may result in the realization of improved network connectivity for the information handling system 100.

Figure 2:
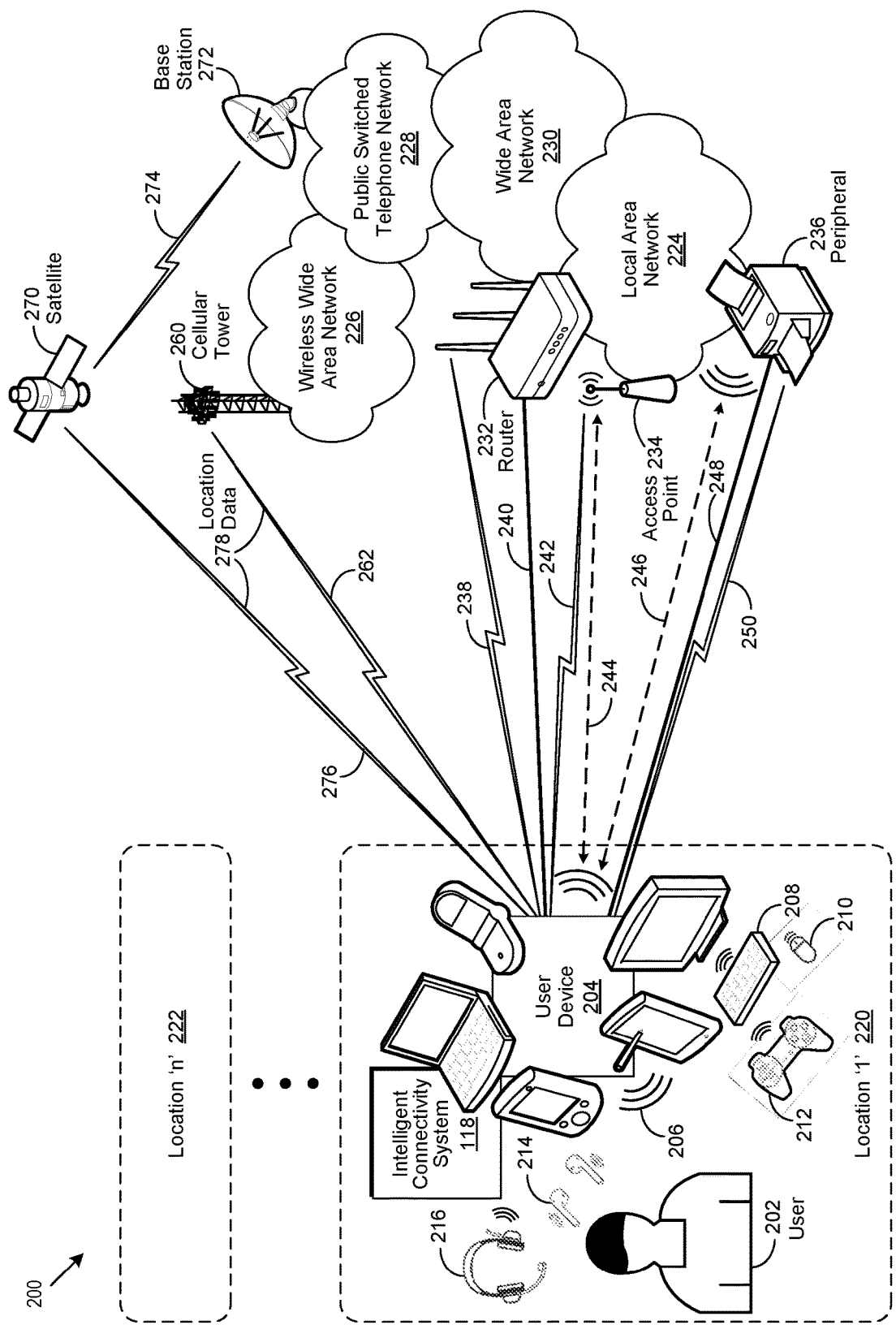
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system 118, described in greater detail herein. In certain embodiments, the intelligent connectivity system 118 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, a user 202 may use the user device 204 to interact with the intelligent connectivity system 118.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204, is physically connected to.

In certain embodiments, the user device 204 may be implemented with communication hardware and software that allows it to communicate with one or more access points 234 via a PAN 244 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the intelligent connectivity system 118 may be implemented to establish a particular network link 206, 238, 240, 242, 244, 246, 248, 250, 262, 276 as the user device 204 moves from location '1' 220 to location 'n' 222. In certain of these embodiments, the establishment of a particular network link 206, 238, 240, 242, 244, 246, 248, 250, 262, 276 may be based upon the availability of connectivity to a corresponding network. In various embodiments, the intelligent connectivity system 118 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the intelligent connectivity system 118 may be implemented to switch from one network link 206, 238, 240, 242, 244, 246, 248, 250, 262, 276 to another according to the user device 204 being present at a particular location '1' 220 through 'n' 222. In various embodiments, the intelligent connectivity system 118 may be implemented to establish two or more simultaneous network links 206, 238, 240, 242, 244, 246, 248, 250, 262, 276. In certain of these embodiments, bandwidth respectively corresponding to the two or more network links 206, 238, 240, 242, 244, 246, 248, 250, 262, 276, may be combined to provide aggregated network link bandwidth for use by the user device.

In various embodiments, the intelligent connectivity system 118 may be implemented to assign network connectivity corresponding to a particular software application, or a user device 204 process, to a particular network link 206, 238, 240, 242, 244, 246, 248, 250, 262, 276. In certain embodiments, the intelligent connectivity system 118 may be implemented to respectively assign two or more software applications, or user device 204 processes, to two or more network links 206, 238, 240, 242, 244, 246, 248, 250, 262, 276, according to their corresponding attributes. For example, the intelligent connectivity system 118 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276 may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the intelligent connectivity system 118 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the intelligent connectivity system 118 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data as to and from an external resource, such as a remote server, as if it was directly connected to the private network. Certain embodiments of the invention reflect an appreciation that a single VPN may not always be sufficient for a particular operational mode, described in greater detail herein.

Accordingly, in certain embodiments, the intelligent connectivity system 118 may likewise be implemented to perform a multi-link network traffic routing operation. As used herein, a multi-link traffic routing operation broadly refers to any operation performed to route network traffic across two or more network links, as described in greater detail herein. In various embodiments, as described in greater detail herein, a multi-link traffic operation may be performed to perform a many-to-many mapping of a plurality of VPN connection to a corresponding plurality of network links. In certain of these embodiments, the many-to-many mapping may be optimized for a particular multi-link configuration. As used herein, as it relates to a many-to-many mapping of a plurality of VPN connection to a corresponding plurality of network links, optimized broadly refers to using certain network link attributes (e.g., available bandwidth, congestion, latency, signal strength, supported protocols, etc.) to determine which network link is best suited for the assignment of a particular VPN.

In certain embodiments, multi-link traffic operations are begun by identifying simultaneously operating VPNs. In various embodiments, the intelligent connectivity system 118 may be implemented to perform certain operations to identify such simultaneously operating VPNs. The configuration policy respectively associated with each identified VPN is then determined. In various embodiments, the configuration policy may be implemented to contain certain information associated with the type of network link supported, the type of traffic that may be routed by each, and so forth, for each VPN.

A network filter driver (NFD), described in greater detail herein, is then used to create n+1 first-in, first-out (FIFO) network traffic queues, where 'n' is defined as the number of previously identified VPNs. Thereafter, a network tunnel indication is created for each identified VPN when it is initiated. In certain embodiments, the network tunnel indication may be implemented as a network tunnel pointer, familiar to those of skill in the art. As an example, network tunnel pointers '1' and '2' may be respectively generated for VPNs '1' and '2.'

Thereafter, each VPN's associated configuration policy is communicated to the NFD. In certain embodiments, the VPN's associated configuration policy may be implemented to define which networks do not require the use of a VPN. In certain embodiments, the VPN's associated configuration policy may be implemented to define which type of network link (e.g., WLAN, WWAN 226, etc.) is supported for the VPN. In certain embodiments, the configuration policy may be implemented to define what kind of network traffic is allowed to be routed to which VPN. In certain embodiments each VPN's associated configuration policy may be implemented to create a list of available VPNs and their associated available network links. Those of skill in the art will recognize that many such embodiments of the use of such a configuration policy are possible. Accordingly, the foregoing is not intended to limit the spirit, scope, or intent of the invention.

Thereafter, a request from the user device's 204 operating system (OS) may be received by the intelligent connectivity system 118 to assign, or reassign, existing network traffic queues to the previously-identified VPNs. To continue the prior example, network traffic queue '1' 4 network tunnel '1', network traffic queue '2' 4 network tunnel '1', and network traffic queue '3' 4 no network tunnel for non-VPN network traffic. If such a request is received, a determination is then made whether a new network traffic queue is needed. If so, then a new network traffic queue is generated and mapped to an associated network tunnel. Thereafter, or if it was previously determined that a new network traffic queue was not needed, then each available network traffic queue is mapped to an available network link, followed by the establishment of a corresponding new VPN.

Figure 3:
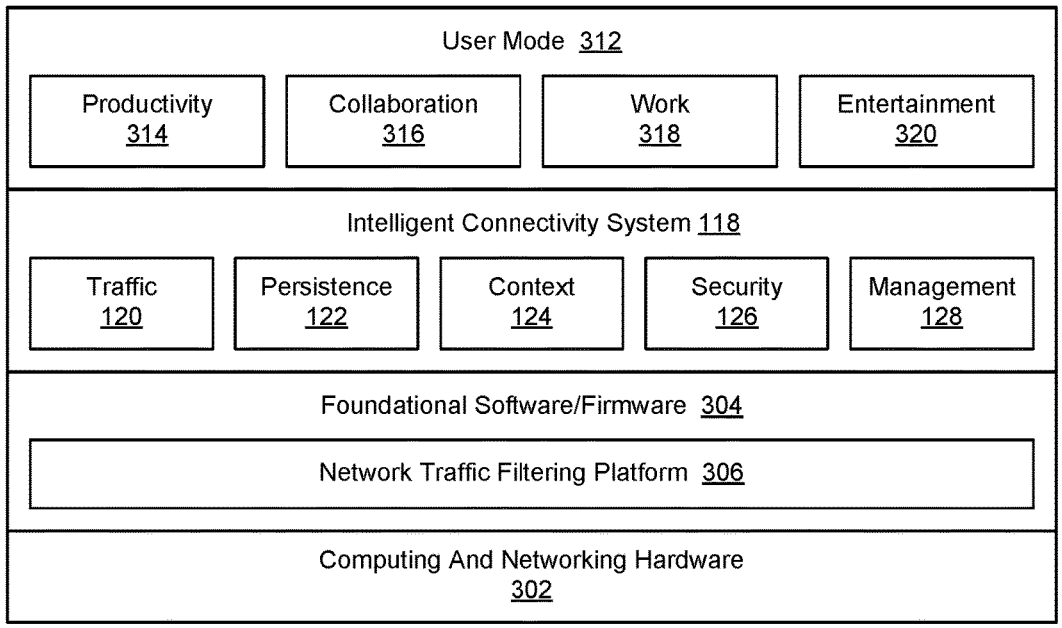
FIG. 3 shows a simplified block diagram of an intelligent connectivity framework.

FIG. 3 shows a simplified block diagram of an intelligent connectivity framework implemented in accordance with an embodiment of the invention. In various embodiments, the intelligent connectivity framework 300 may be implemented to include certain computing and communication hardware 302, certain foundational software and firmware 304, an intelligent connectivity system 118, and one or more operational modes 312, or a combination thereof. In certain embodiments, the computing and communications hardware 302, and the foundational software and firmware 304, or a combination thereof, may be implemented on a user device, described in greater detail herein.

In various embodiments, certain foundational software and firmware 304 may be implemented with certain computing and communication hardware 302, as described in greater detail herein, to detect the availability of connectivity to a particular network. In various embodiments, certain foundational software and firmware 304 may likewise be implemented with certain computing and communication hardware 302 to establish a network link to a detected network, as likewise described in greater detail herein, to communicate information. In certain embodiments, the information may be communicated over one or more virtual private network (VPN) connections. In certain embodiments, the foundational software and firmware 304 may be implemented to include a network traffic filtering platform 306. In certain embodiments, the network traffic filtering platform 306 may be implemented as a WINDOWS® kernel mode filter driver.

In certain embodiments, the intelligent connectivity system 118 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks. In various embodiments, the intelligent connectivity system 118 may be implemented to use certain computing and communication hardware 302 and certain foundational software and firmware 304, individually or in combination, to perform a particular intelligent connectivity operation.

In certain embodiments, the intelligent connectivity system 118 may be implemented to include a traffic component 120, a persistence component 122, a context component 124, a security component 126, and a management component 128, or a combination thereof. In certain embodiments, the traffic component 120, persistence component 122, context component 124, security component 126, or management component 128 may be implemented, individually or in combination, to perform a particular intelligent connectivity operation. In certain embodiments, the traffic component 120 may be implemented to determine whether one or more networks are available to provide network connectivity to the information handling system 100. In certain embodiments, the traffic component 120 may be implemented to use the one or more networks, individually or in combination, to provide network connectivity to a user device.

In certain embodiments, the persistence component 122 may be implemented to use two or more networks, individually or in combination, to provide network connectivity continuity to a user device. In certain embodiments, the context component 124 may be implemented to select one or more networks to provide network connectivity to a user device based upon the context in which the user device is being used. In certain embodiments, the security component 126 may be implemented to select one or more networks to provide secure network connectivity to a user device. In various embodiments, the management component 128 may be implemented to manage certain aspects of network connectivity provided by one or more networks to a user device.

In various embodiments, the intelligent connectivity system 118 may be implemented to provide certain network connectivity, at a particular time, or location, or both, to a user device according to its current operational mode 312. As used herein, an operational mode 312 of a user device broadly refers to the purpose it may be used for. In certain embodiments, the operational mode 312 of a user device may be associated with the use of a particular user device for productivity 314, collaboration 316, work 318, or entertainment 320, or a combination thereof.

As used herein, and as it relates to an operational mode 312, productivity 314 broadly refers to the ratio of output volume to input volume. For example, a consultant for a construction company may need to estimate the cost of a project while at a client's jobsite. In this example, the consultant may enter certain information related to the project, such as the amount and cost of certain materials and anticipated labor costs, into a project estimation application running on a mobile user device. To continue the example, the estimator may achieve a certain level of productivity 314 by simply using the project estimation application to generate an initial estimate.

However, the consultant may achieve a greater level of productivity 314 if the user device is able to use available network connectivity to establish two virtual private network (VPN) connections, one to the consultant's resources and another to the client's resources. If so, then the consultant can use the first VPN connection to securely access past estimates for similar projects, which in turn can be used to prepare a final estimate for the client. Once the final estimate is completed, the second VPN connection can be used to present it to the client.

As used herein, and as it relates to an operational mode 312, collaboration 316 broadly refers to the action of interacting with someone to achieve a common purpose. Skilled practitioners of the art will recognize that many examples of such a common purpose are possible. As an example, the common purpose may be for a group of individuals with a common interest to use their respective user devices to participate in a videoconference to produce or create something. As another example, the common purpose may be for a group of friends to use their respective user devices to meet via videoconference on a regular basis to maintain their relationship.

As used herein, and as it relates to an operational mode 312, work 318 broadly refers to an exertion or effort to produce or accomplish something. Those of skill in the art will be aware that work may take many forms. As an example, an exterminator may be paid by the job. In this example, the exterminator may stop in a coffee shop, access their public WiFi network, and establish a VPN connection to his office. Once connected, the exterminator may securely download his assignments for the day. Then, one by one, he continues on to each location and completes his assignment. To continue the example, after completion of each assignment the exterminator may then complete a report. Once it is complete, the exterminator may then access a cellular network, establish a VPN connection, and then securely upload each report to his office.

Certain embodiments of the invention reflect an appreciation that not all work 318 is performed for monetary reward. For example, some work 318 may be performed for educational purposes. To illustrate this example, a student may use a mobile user device, no matter where they may be, to access knowledge resources through a network connection, use those resources to complete an assignment, and then submit it using the same, or a different, network connection.

As another example, some work 318 may be performed for altruistic reasons. To illustrate this example, a member of a non-profit organization may volunteer to check on the wellbeing of elderly residents. In this example, the volunteer may use the WiFi connection in her home to establish a VPN connection with the non-profit. Once the VPN connection is established, she downloads the list of residents, and their addresses, she is scheduled to visit that day to her tablet computer. She then uses the tablet computer throughout the morning to note the status of each resident. The volunteer then stops at a restaurant for lunch. Once she has ordered she accesses the WiFi network connection in the restaurant, establishes a VPN connection with the non-profit, and uploads a report summarizing the results of her morning's work.

As used herein, and as it relates to an operational mode 312, entertainment 320 broadly refers to the action of providing, or being provided, with amusement or enjoyment. Skilled practitioners of the art will recognize that entertainment may take many forms. As an example, a user may use a mobile device to wirelessly connect to a Local Area Network (LAN) in their home. Once the connection is established, the user may access a streaming movie service. Once the streaming movie service is accessed, and a movie selected, the user may then use a Bluetooth connection to wirelessly connect a pair of earphones to their mobile device. Once connected, the user can then view the movie on the mobile device as they listen to the movie's soundtrack on their wireless headphones.

As another example, a user may use a gaming computer to play an online, multi-user game. In this example, the user may use a wired connection to the LAN in their home for the gaming computer and a cellular network connection for their mobile phone. To continue the example, the gaming computer may use the wired connection to the LAN to ensure that whatever bandwidth is available on the LAN is dedicated to the online game itself. Likewise, the user may use the mobile phone's connection to the cellular network to carry on a conversation with other players of the online game.

Certain embodiments of the invention reflect that it is possible that a particular operational mode 312 may be associated with the simultaneous use of a particular user device for productivity 314, collaboration 316, work 318, or entertainment 320, or a combination thereof. As an example, a game developer may use a user device, in combination with one or more network connections, while developing a game. In this example, the developer may use the user device, and the one or more network connections to improve their productivity 314, collaborate 316 with co-workers, work 318 on various aspects of the game, all the while being entertained 320 by the game itself. Those of skill in the art will recognize that many such examples of an operational mode 312 are possible. Accordingly, the foregoing is not intended to limit the spirit, scope, or intent of the invention.

Figure 4:
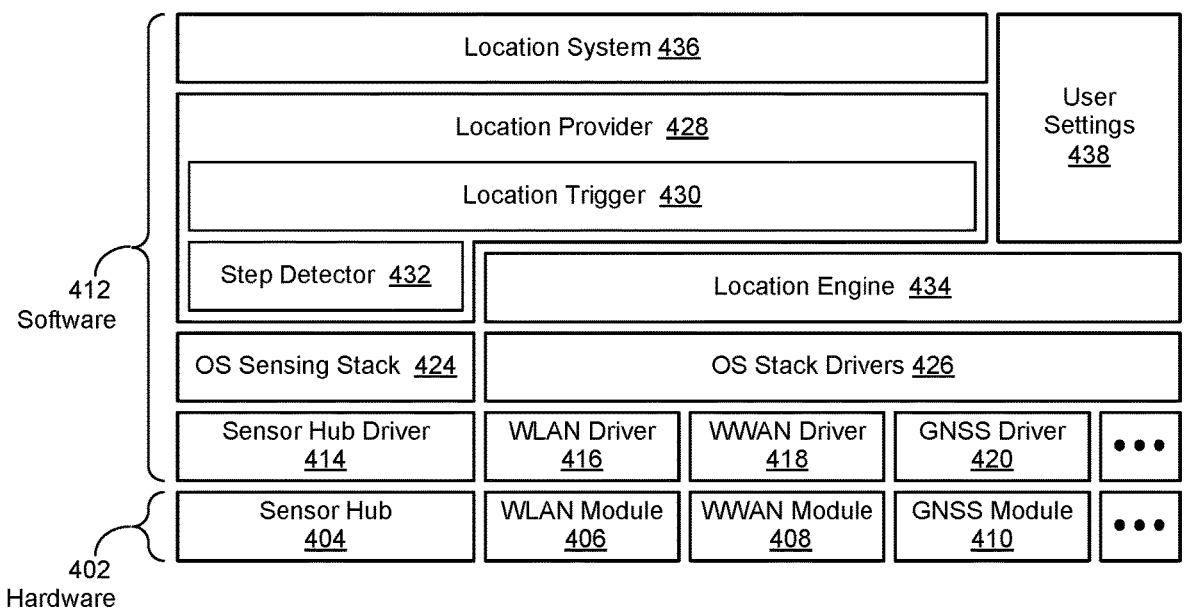
FIG. 4 shows hardware and software components used in the performance of an adaptive link persistence operation.

FIG. 4 shows hardware and software components used in the performance of an adaptive link persistence operation implemented in accordance with an embodiment of the invention. In various embodiments, a user device may be implemented with certain hardware 402 and software 412 components that it may use to determine its location and the location of certain network links, described in greater detail herein. In certain embodiments, the hardware components 402 may include a location sensor hub 404 module, a Wireless Local Area Network (WLAN) 406 module, a Wireless Wide Area Network (WWAN) 408 module, a Global Navigation Satellite System (GNSS) 410 module, and so forth.

As used herein, a sensor hub 404 module broadly refers to a hardware module configured to integrate sensor data from different sensors and process them. In certain embodiments, the sensor hub 404 module may be implemented to off-load sensor-related operations and processes from a user device's primary central processing unit (CPU) to reduce battery consumption and provide associated performance improvements. One known example of a sensor hub 404 module is the Intel® Integrated Sensor Hub (ISH).

In certain embodiments, the WLAN 406 module may be implemented to communicate data through a network link to an associated WLAN. In certain embodiments, the WWAN 408 module may be implemented to communicate data through a network link to an associated WWAN. In various embodiments, the GNSS 410 module may be implemented to receive certain Global Position System (GPS) data from a GPS satellite.

In certain embodiments, the software components 412 may include a sensor hub 414 driver, a WLAN 416 driver, a WWAN 418 driver, a GNSS 420 driver and so forth. In certain embodiments, the sensor hub 414, WLAN 416, WWAN 418, and GNSS 420 drivers may be implemented to respectively provide a programming interface to control and manage the sensor hub 404, WLAN 406, WWAN 408, and GNSS 410 modules. In certain embodiments, the software components 412 may likewise include an operating system (OS) sensing stack 424 and OS stack drivers 426 familiar to skilled practitioners of the art.

Likewise, in certain embodiments, the software components 412 may include a location engine 434. In certain embodiments, the location engine 434 may be implemented to perform a location determination operation. As used herein, a location determination operation broadly refers to any operation performed to determine the location of a user device, and the location of an available network, and the distance between the two.

In certain embodiments, the software components 412 may likewise include a location provider 428 module. In certain embodiments, the location provider 428 module may be implemented to include a location trigger 430 sub-module, or a step detector 432 sub-module, or both. In various embodiments, the location trigger 430 sub-module may be implemented to perform a geofencing operation. As used herein, a geofencing operation broadly refers to any operation performed to establish a virtual perimeter, commonly referred to as a geo-fence, for a corresponding real-world geographic area.

In certain embodiments, a geo-fence may be dynamically generated, such as a radius around a particular geographic point. In certain embodiments, a geo-fence may be generated as a set of predefined geographic boundaries. In certain embodiments, the location trigger 430 sub-module may be implemented to generate an alert when an associated user device approaches the boundaries of a particular geo-fence. In certain embodiments, the step detector 432 sub-module may be implemented to measure individual steps a user may make in the course of using a particular user device. In various embodiments, the step detector 432 sub-module may be implemented to use certain information provided by a motion sensor, or accelerometer, or both, to make such user step measurements.

In various embodiments, the location trigger 430 sub-module and the step detector 432 sub-module may be implemented, individually or in combination, to provide certain location information they may generate to the location provider 428 module. In various embodiments, the location provider 428 module may be implemented to generate location information for use by software applications executing on a user device. In certain embodiments, the location provider 428 module may be implemented to determine the geographic location of an associated user device by WLAN triangulation, use of location information provided through the use of the IEEE 802.11mc standard, IP address resolution, cellular network tower triangulation, use of Global Position System (GPS) information, or a combination thereof. In various embodiments, the location provider 428 module may be implemented to use certain location information provided by the location trigger 430 and step detector 432 sub-modules to provide location information for use in a location network tag (LNT), described in greater detail herein. One known example of a location provider 428 module is the WINDOWS® LOCATION PROVIDER®, familiar to those of skill in the art.

In certain embodiments, the software components 412 may include a location system 436. In various embodiments, the location system 436 may be implemented to use certain known artificial intelligence (AI) and machine learning (ML) approaches to estimate a particular network link's expected throughput, latency, coverage, signal strength, and other network connectivity metrics. In various embodiments, the location system 436 may be implemented to certain location information provided by the location provider 428, or LNT information it may generate, in the use of such AI and ML approaches.

In certain embodiments, the software components 412 may likewise include a user settings 438 module. In certain embodiments, the user settings 438 module may be implemented to store certain network connectivity settings associated with a user of a user device. Skilled practitioners of the art will recognize that many such embodiments are possible. Accordingly, the foregoing is not intended to limit the spirit, scope, or intent of the invention.

Figure 5A:
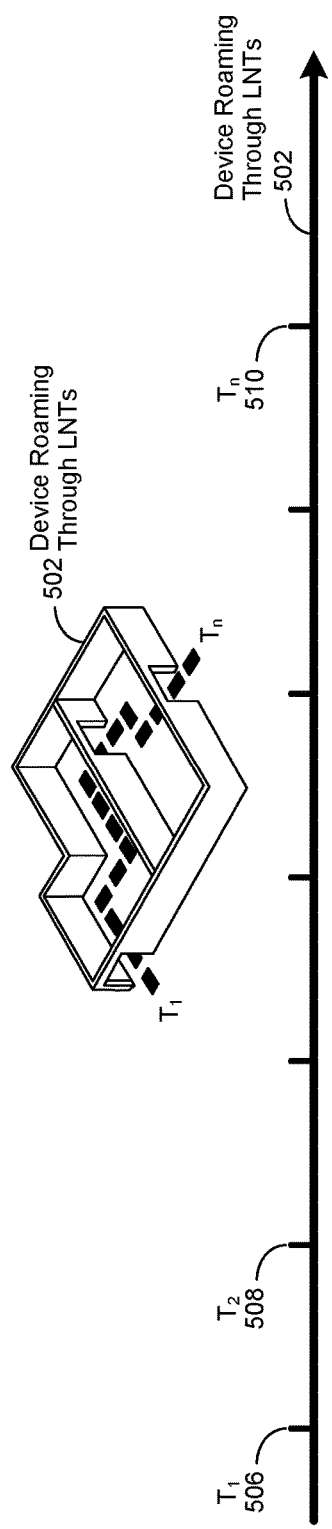
FIGS. 5a and 5b show adaptive link persistence process flows associated with a user device roaming through a plurality of location network tags (LNTs)
Figure 5B:
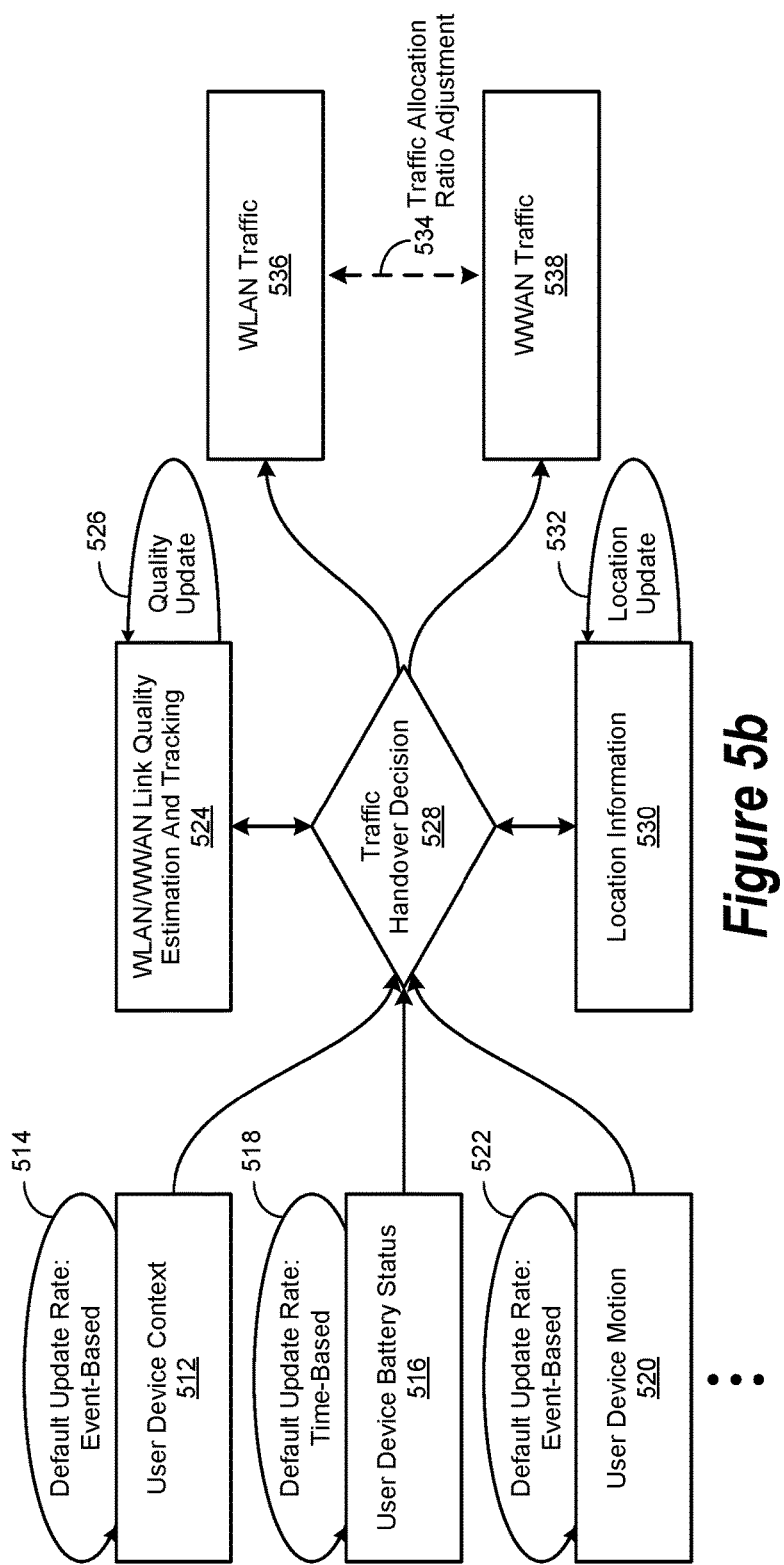

FIGS. 5a and 5b show adaptive link persistence process flows associated with a user device roaming through a plurality of location network tags (LNTs) implemented in accordance with an embodiment of the invention. As used herein, an LNT broadly refers to a collection of location and operational information (where the collection of location and operational information may be generally referred to as a location quality identifier) that can be used to describe the physical location of a network link and its associated characteristics. In various embodiments, the location information may include certain geospatial location information, such as coordinates (e.g., latitude and longitude), bearings, altitude, distances, physical addresses, and so forth.

In certain embodiments, the location information may be provided by the implementation of Windows® Location Provider on a user device. In certain embodiments, the operational information may include the type of network link (e.g., WLAN, WWAN, etc.), the protocol it may be based upon (e.g., IEEE 802.11a/b/g/n/ac, 3G/4G/5G cellular, etc.), available bandwidth, signal strength, latency, and so forth. In certain embodiments, the operational information may likewise include the date and time such operational information is collected.

In various embodiments, an intelligent connectivity system, described in greater detail herein, may be implemented to receive certain location information associated with a particular LNT. In certain embodiments, the intelligent connectivity system may be implemented to receive location information respectively associated with a plurality of LNTs, such as LNTs $T_1$ 506, and $T_2$ 508 through $T_n$, 510 shown in FIG. 5a, as an associated user device roams 502 through their corresponding network link locations.

Referring now to FIG. 5b, certain information associated with the user device's context 512, described in greater detail herein, is collected and provided in various embodiments to a network traffic handover decision system 528. In certain embodiments, the user device context 512 information is updated 514. In certain embodiments, the updating 514 of the user device context 512 information occurs periodically, or according to the occurrence of a particular event, or a combination of the two.

In various embodiments, certain information associated with the user device's battery status 516, described in greater detail herein, is collected and provided to the network traffic handover decision system 528. In certain embodiments, the user device's battery status 516 information is updated 518. In certain embodiments, the updating 518 of the user device's battery status 516 information occurs periodically, or according to the occurrence of a particular event, or a combination of the two.

In various embodiments, certain information associated with the user device's motion 520, described in greater detail herein, is collected and provided to the network traffic handover decision system 528. In certain embodiments, the user device's motion 520 information is updated 522. In certain embodiments, the updating 522 of the user device's motion 520 information occurs periodically, or according to the occurrence of a particular event, or a combination of the two.

In various embodiments, information associated with the network link quality of certain WLANs and WWANs, described in greater detail herein, is estimated and tracked 524 as the user device roams through their respective network link locations. In certain embodiments, the resulting estimated and tracked 524 network link quality information is provided to the network traffic handover decision system 528. In certain embodiments, the estimated and tracked 524 network link quality information is updated 526. In certain embodiments, the updating 526 of the estimated and tracked 524 network link quality information occurs periodically, or according to the occurrence of a particular event, or a combination of the two.

In various embodiments, the intelligent connectivity system may be implemented, as described in greater detail herein, to collect certain location 530 information, likewise described in greater detail herein. In certain embodiments, the collected location 530 information is provided to the network traffic handover decision system 528. In certain embodiments, the collected location 530 information is updated 532. In certain embodiments, the updating 532 of the collected location 530 information occurs periodically, or according to the occurrence of a particular event, or a combination of the two.

In certain embodiments, the network traffic handover decision system 528 may be implemented to process the user device context 512, user device battery status 516, user device motion 520, estimated and tracked network link 524, and location 530 information, or a combination thereof, to generate a network traffic handover decision. In certain embodiments, the network traffic handover decision may be based upon speed calculation, battery consumption rate, network traffic ratio, scan trigger time, one or more enable/disable decisions, hysteresis, or a combination thereof. In certain embodiments, as described in greater detail herein, the network traffic handover decision may result in all network traffic, or a portion thereof, being handed over to a particular WLAN 536 link or WWAN 538 link. In various embodiments, as likewise described in greater detail herein, certain portions of network traffic may be allocated 534 between a particular WLAN 536 link and a particular WWAN 538 link.

In certain embodiments, the allocation 534 of network traffic between a WLAN 536 link and a WWAN 538 link may be based upon the user device context at the time. In certain embodiments, the network traffic may be allocated 534 between a WLAN 536 link and a WWAN 538 link user device session-by-user device session. As used herein, a user device session broadly refers to an interval of time during which a user device may be used by a user for a particular user device context, described in greater detail herein. In various embodiments, the contextual information may include information related to certain quality metrics for a WLAN 536 or WWAN 538 link. In certain embodiments, the duration of a particular user device session may be based upon the power state (e.g., estimated remaining battery charge) of the user device. In certain embodiments, the contextual information may be used to determine the percentage of network traffic, or type of network traffic, or the ratio of such network traffic, that may be assigned to a particular WLAN 536 or WWAN 538 link. In certain embodiments, the network traffic may be allocated 534 between a WLAN 536 link and a WWAN 538 link in units of sessions (e.g., groups of five sessions each) within a particular user device context.

In certain embodiments, the ratio of network traffic allocated 534 between a WLAN 536 link and a WWAN 538 link may be adjusted user device context by user device context. In certain embodiments, the ratio of network traffic allocated 534 between a WLAN 536 link and a WWAN 538 link may be adjusted session-by-session within a particular user device context. In certain embodiments, the ratio of network traffic allocated 534 between a WLAN 536 link and a WWAN 538 link may be adjusted in units of sessions (e.g., groups of five sessions each) within a particular user device context.

FIG. 6 shows a table of example user device contexts and associated inputs used in accordance with an embodiment of the invention to generate corresponding network traffic handover decision outputs. In various embodiments, a network traffic handover engine may be implemented, as described in greater detail herein, to receive certain information related to a particular user device context 602, along with certain additional inputs 612 related to the user device itself, or available network links, or a combination thereof. As used herein, user device context 602 broadly refers to one or more purposes a user device may be used for at a particular time, at a particular location, by a particular user, or a combination thereof. As shown in FIG. 6, examples of such user device contexts 602 include videoconferencing, audio chat, gaming, cloud storage, and so forth.

In various embodiments, the additional inputs 612 received by the network traffic handover engine may include certain information associated with the state 618 of the user device's battery (e.g., less than 10% remaining). In various embodiments, the additional inputs 612 may include certain motion detection 616 information (e.g., movement towards or away from a location associated with a known network link). In various embodiments, the additional inputs 612 may include certain information associated with the quality of an available Wireless Local Area Network (WLAN) link 618. In various embodiments, the additional inputs 612 may include certain information with the quality of an available Wireless Wide Area Network (WWAN) link 620. Skilled practitioners of the art will recognize that many such embodiments of additional inputs 612 are possible. Accordingly, the foregoing is not intended to limit the spirit, scope, or intent of the invention.

In various embodiments, the network traffic handover engine may be implemented to process certain information associated with a particular user device context 602, and certain additional input 612 information, to generate a network traffic handover decision output 622. In certain embodiments, the network traffic handover decision output 622 may include a decision to assign certain network traffic to a particular WLAN 624, or a particular WWAN 626, or a combination of the two. For example, as shown in FIG. 6, the user device context 602 may be videoconferencing.

In this example, the battery state 614 of the user device may be high and motion detection 616 information may indicate that the user device is moving away from a WLAN link location and towards a WWAN link location. Furthermore, the quality of the WLAN link 618 may be determined to be poor, while the quality of the WWAN link 620 may be determined to be good. Accordingly, a resulting network traffic handover decision output 622 may be generated to seamlessly hand over the videoconferencing network traffic from the WLAN 624 link to the WWAN 626 link.

As another example, likewise as shown in FIG. 6, the user device context 602 may be concurrent videoconferencing, cloud storage updating, and audio chat. In this example, the battery state 614 of the user device may be high and motion detection 616 information may indicate that the user device is moving away from a WLAN link location and towards a WWAN link location. Furthermore, the quality of the WLAN link 618 may be determined to be poor, while the quality of the WWAN link 620 may be determined to be good. To continue the example, the network traffic handover engine may be implemented to understand that the videoconferencing and audio chat user device contexts 602 may need a good quality network link to deliver satisfactory performance to a user. Likewise, satisfactory performance can be realized by the user even if a poor quality network link is used for the cloud storage update user device context 602.

Accordingly, a resulting network traffic handover decision output 622 may be generated to assign network traffic associated with the cloud storage update user device context 602 to the WLAN link 624. Likewise, a resulting network traffic handover decision output 622 may be generated to seamlessly hand over the network traffic associated with the videoconferencing and audio chat user device context 602 to the WWAN 626 link. Those of skill in the art will recognize that many such examples are possible. Accordingly, the foregoing is not intended to limit the spirit, scope, or intent of the invention.

Figure 7:
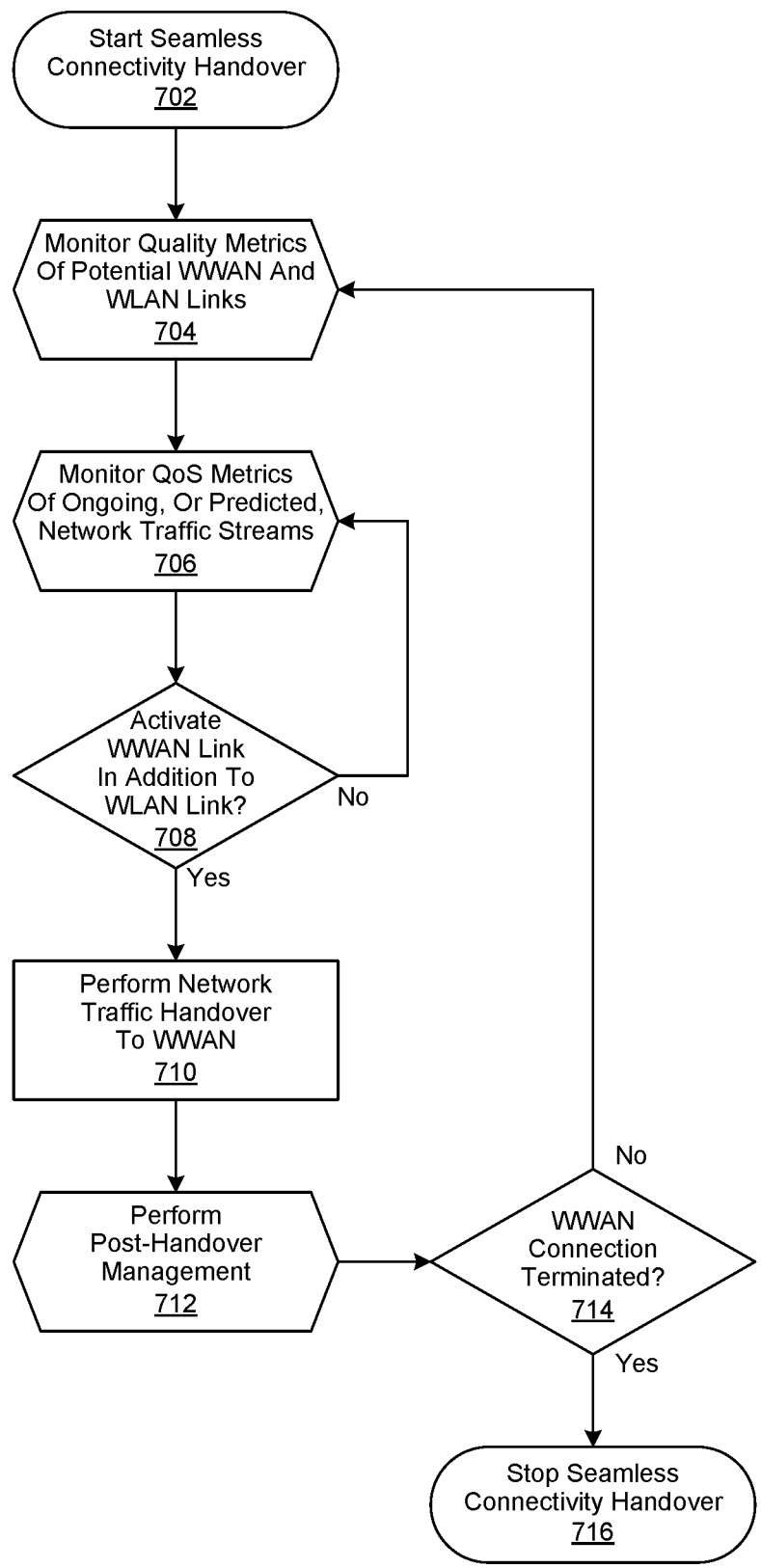
FIG. 7 is a flowchart of the performance of seamless connectivity handover operations.

FIG. 7 is a flowchart of the performance of seamless network connectivity handover operations implemented in accordance with an embodiment of the invention. In this embodiment, seamless connectivity handover operations are begun in step 702, followed by the ongoing performance of operations in step 704 to monitor quality metrics corresponding to detected Wireless Local Area Network (WLAN) and Wireless Wide Area Network (WWAN) links that may potentially be used. In various embodiments, certain quality metrics corresponding to potential WLAN and WWAN links are monitored concurrently and respectively stored in an associated Location Network Tag (LNT), described in greater detail herein.

In certain embodiments, two or more network links may be combined, as described in greater detail herein, to form a composite network link. In certain embodiments, location and associated operational information corresponding to each network link may be used to generate a composite network link profile. In certain embodiments, an intelligent connectivity system, described in greater detail herein, may be implemented to generate such a composite network link profile.

Various embodiments of the invention reflect an appreciation that certain metrics associated with individual network links, such as Time of Flight (ToF), Received Signal Strength Indicator (RSSI), sensor inputs, geospatial location information, and so forth, may be used to generate indirect indices of a composite network link's capacity. However, certain embodiments of the invention reflect that such indirect indices may prove insufficient when attempting to determine which network link(s) to use for a particular purpose or context, as described in greater detail herein. Accordingly, in various embodiments, certain artificial intelligence (AI) and machine learning (ML) approaches known to those of skill in the art may be implemented to perform a priori updating correlations between indirect indices and observed quality metrics, such as expected throughput, expected latency, expected coverage, and so forth, to predict the best network link candidates.

In various embodiments, quality metrics for a particular WWAN link may be obtained from service log entries, or signal strength measurements made at certain locations and times. In various embodiments, certain geographical interpolation approaches may be implemented to generate estimated quality metrics for a particular network link. In certain of these embodiments, the estimated quality metrics may be based upon location information corresponding to a particular user device. In certain embodiments, such location information may be gathered through the implementation of known WiFi location services, Bluetooth location services, Global Position System (GPS) information, motion sensor information, and so forth. In certain embodiments, the resulting estimated quality metrics may be used to update an associated composite network link profile periodically, or according to the occurrence of a particular event, or a combination of the two.

Ongoing operations are then performed in step 706 to monitor certain network traffic Quality of Service (QoS) metrics, familiar to skilled practitioners of the art, associated with currently active, or predicted, streams of network traffic. In various embodiments, the network traffic QoS metrics may include certain network traffic QoS sub-metrics, such as data rate, latency, jitter, priority, reliability, and so forth. In certain embodiments, the network traffic QoS metrics, or sub-metrics, or a combination of the two may be used to update an associated composite network link profile periodically, or according to the occurrence of a particular event, or a combination of the two.

A determination is then made in step 708 whether to activate a particular WWAN network link in addition to the currently active WLAN link. In various embodiments, the determination may be made by a network traffic handover decision engine. In certain embodiments, the network traffic handover decision engine may be implemented to use certain AI or ML approaches, described in greater detail herein, to perform the determination of whether or not to activate a particular WWAN link, and if so, when. In various embodiments, the network traffic handover engine may likewise be implemented to determine the portion of current WLAN traffic that will be handed over to the WWAN network link. In certain of these embodiments, the portion of current WLAN traffic to be handed over may be determined according to predicted WLAN network traffic metrics (e.g., throughput, latency, etc.), predicted WWAN network link metrics (e.g., throughput, latency, etc.), and analysis results of network traffic QoS requirements, or a combination thereof.

In certain embodiments, handover of network traffic from a WLAN link to a WWAN link may be partial or complete. In certain embodiments, some portion of sessions (e.g., 0-100%) with the same destination may be handed over to the WWAN network link. In certain embodiments, a partial handover of network traffic to a WWAN network link may be performed session-by-session, or in multiple sessions, or a combination thereof.

If it is determined in step 708 not to activate a WWAN link in addition to a currently active WLAN link, then network traffic, in part or in whole, is handed over from the currently active WLAN link to a particular WWAN link in step 710. In various embodiments, certain portions of network traffic may be handed over to the WWAN network link. In certain embodiments, the partial handover of network traffic may be performed according to the respective network connectivity needs of one or more applications (e.g., videoconferencing, audio chat, cloud storage updates, etc.) executing on an associated user device.

Ongoing post-handover network traffic management operations are then performed in step 712. In certain embodiments, the portion of network traffic respectively assigned to a particular WLAN or WWAN network link may be adjusted according to degradation of signal strength, or other metrics, associated with each individual network link. In certain embodiments, network traffic, may be handed back, completely or partially, from the WWAN network link to the WLAN network link should the signal strength, or other metrics associated with the WWAN network link degrade. In certain embodiments, the ratio of network traffic respectively assigned to a particular WLAN or WWAN network link may be adjusted periodically, or according to the occurrence of a particular event, or a combination of the two.

A determination is then made in step 714 whether the network connection to the WWAN network link has terminated. As an example, a mobile device's battery may reach a low level, at which time the connection to a WWAN network link may be terminated. As another example, a connection to a WWAN network link may be terminated if its signal strength begins to degrade and a WLAN network link having a stronger signal strength becomes available.

As yet another example, a connection to a WWAN network link may be terminated if the user device's WWAN communications hardware begins to malfunction. As yet still another example, a connection to a WWAN network link may be terminated if network connectivity is no longer needed by the user device. If it is determined in step 714 that connection to the WWAN network link has not terminated, then the process is continued, proceeding with step 704. Otherwise, seamless network connectivity handover operations are terminated in step 716.

Figure 8:
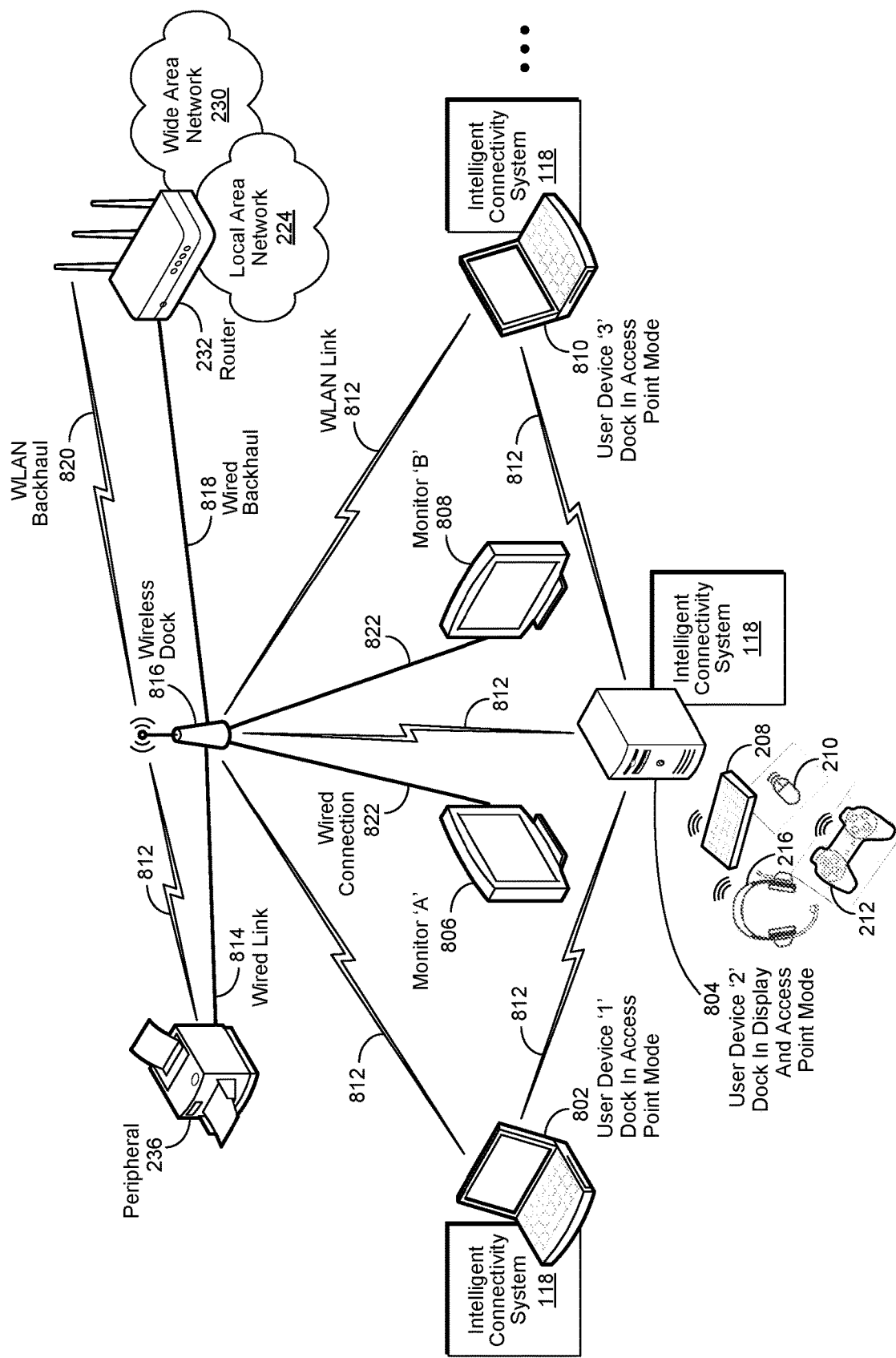
FIG. 8 shows a simplified block diagram of seamless connectivity handover operations.

FIG. 8 shows a simplified block diagram of seamless connectivity handover operations implemented in accordance with an embodiment of the invention. In certain embodiments, a router 232, familiar to skilled practitioners of the art, may be implemented to provide network connectivity to a Local Area Network (LAN) 224, or a Wide Area Network (WAN) 230, or both. In certain embodiments, a wireless dock 816, familiar to those of skill in the art, may be implemented to establish network connectivity with the router 232 via a wired 818 backhaul connection (e.g., an Ethernet connection), or one or more Wireless Local Area Network (WLAN) 820 backhaul connections.

In certain embodiments, the wireless dock 816 may likewise be implemented provide user devices '1' 802, '2' 804, '3' 810, and so forth, wireless access to the LAN 224, or the WAN, or both, via one or more Wireless Local Area Network (WLAN) links 812. Likewise, in certain embodiments, the wireless dock 816 may be implemented to establish one or more network links to one or more peripherals 236, such as a printer, via a wired 814 network link, or one or more WLAN 812 links, or a combination thereof. In certain embodiments, the wireless dock 816 may be implemented to provide a connection to one or peripherals, such as monitors 'A' 806 and 'B' 808 via a wired connection 822. Examples of such wired connections 822 include a Universal Serial Bus (USB) connection, an IEEE 1394 connection, a Digital Visual Interface (DVI) connection, a DisplayPort connection, a High-Definition Multimedia Interface (HDMI) connection, and so forth. In certain embodiments, the wireless dock 816 may likewise be implemented to provide one or more Personal Area Network (PAN) links with one or more input/output (I/O) devices, such as a keyboard 208, a mouse 210, a gaming controller 212, a headset 216, and so forth.

In various embodiments, user devices '1' 802, '2' 804, '3' 810, and so forth may be implemented to support certain Dual-Band Simultaneous (DBS) approaches familiar to skilled practitioners of the art that allow two or more concurrent Wireless Fidelity (WiFi) channels (e.g., 2.4 GHz and 5 GHz) to be combined. Those of skill in the art will likewise be aware that such DBS approaches typically result in WLAN links that have higher speed, reduced latency, and less interference. In various embodiments, an intelligent connectivity system 118 may be respectively implemented with user devices '1' 802, '2' 804, '3' 810, and so forth, to use certain DBS capabilities to perform an adaptive link persistence operation. As used herein, an adaptive link persistence operation broadly refers to any operation whose performance enables network connectivity for a particular user device to be persisted through the use of one or more network links.

Various embodiments of the invention reflect an appreciation that connectivity throughput may not be as important as seamless, persistent connectivity for certain user device contexts, described in greater detail herein. Certain embodiments of the invention likewise reflect an appreciation that the ability to identify a particular user device context, initiate redundant network links, and perform seamless contextual failover switching, described in greater detail herein, may be advantageous. As an example, a particular user device may be implemented with DBS capabilities that allow it to simultaneously use two WiFi channels (e.g., 2.4 GHz and 5 GHz) for higher network connectivity speed. In this example, network connectivity may be sustained on one WiFi channel if the other WiFi channel deteriorates to the point it can no longer convey network traffic.

As another example, certain back-channel keyboard 208 and mouse 210 data may be communicated over a WiFi network connection through the use of the media-agnostic USB (MA-USB) protocol. In this example, ensuring the protection of such data is more important than throughput as loss of keyboard 208 and mouse 210 data would disrupt the user experience. As yet another example, certain control operations communicated between two user devices (e.g., user devices '1' 802 and '2' 804), or between a user device and one or more peripherals (e.g., user device '2' 804 and monitors 'A' 806 and 'B' 808), may need to be protected. In certain embodiments, the protocol used to communicate such control operations may include Near Field Communications (NFC), NFC over WiFi, or sideband L2-L3 over WiFi, or a combination thereof.

As yet still another example, it may likewise be important to protect game controller 212 information during a peer-to-peer (P2P) streaming session while playing an online game. In this example the protocol used to communicate the gaming controller 212 information may include Bluetooth, WiFi, and others. Those of skill in the art will recognize that many such examples are possible. Accordingly, the foregoing is not intended to limit the spirit, scope, or intent of the invention.

FIG. 9 shows a table of example multi-link redundancy decisions corresponding to certain network link applications and their associated application categories implemented in accordance with an embodiment of the invention. In certain embodiments, a particular network link application 902 may be assigned to an associated application category 904, which in turn results in a corresponding multi-link redundancy decision 906. For example, as shown in FIG. 9, a network link may be established to support uncorded (UC) voice communications with built-in packet resiliency. In this example the network link application 902 may be assigned to application category 904 '1,' which has the attributes of real-time, low-latency, and inherent resiliency. To continue the example, classification of the network link application 902 to application category 904 '1' results in a multi-link redundancy decision 906 of category '1,' which is no multi-link redundancy.

As another example, a network link may be established to support Media-Agnostic Universal Bus (MA-USB) communications over WiFi for a wireless dock. In this example the network link application 902 may be assigned to application category 904 '2,' which has the attributes of real-time, critical to user experience, and no inherent resiliency. To continue the example, classification of the network link application 902 to application category 904 '2' results in a multi-link redundancy decision 906 of category '2,' which is multi-link redundancy with choice of real-time variable channel redundancy methods, as a function of packet loss. Certain embodiments of the invention reflect an appreciation that the provision of multi-link redundancy, as described in greater detail herein, effectively provides redundancy for each layer of the Open Systems Interconnection (OSI) model.

As yet another example, a network link may be established to support Near Field Communications (NFC) over WiFi. In this example the network link application 902 may be assigned to application category 904 '3,' which has the attributes of delayed real-time, but critical to user experience, and no inherent resiliency. To continue the example, classification of the network link application 902 to application category 904 '3' results in a multi-link redundancy decision 906 of category '3,' which is multi-link redundancy with robust delayed real-time variable channel redundancy methods, as a function of packet loss. Those of skill in the art will recognize that many such examples are possible. Accordingly, the foregoing is not intended to limit the spirit, scope, or intent of the invention.

FIG. 10 shows a table of scoring thresholds and associated hysteresis periods corresponding to certain application categories implemented in accordance with an embodiment of the invention. In this embodiment, a particular application category 904, described in greater detail herein, may have an associated scoring threshold 1006, which may be used to determine a corresponding hysteresis period 1008. For example, as shown in FIG. 10, application categories 904 '1,"2,"3,' and so forth, may respectively have a scoring threshold of 'N/A,"30,"20,' and so forth, and a corresponding hysteresis period 1008 of 'N/A,' "30 seconds," "180 seconds," and so forth.

FIG. 11 shows a table of input attributes and associated output classifications corresponding to certain seamless connectivity handover use cases implemented in accordance with an embodiment of the invention. In certain embodiments, a particular seamless connectivity handover use case 1102 may have associated inputs of interval between packet bursts 1104 and interval between packets and any ACKs 1106, which in turn are used to determine an associated output category classification 1108, and an output channel redundancy classification 1110.

For example, as shown in FIG. 11, the seamless connectivity handover use case 1102 of low-latency P2P gaming may have interval between packet bursts 1104 input that is consistent with minimal standard development, indicating steady state frames-per-second (fps) type network traffic for low-latency gaming. The seamless connectivity handover use case 1102 of low-latency P2P gaming may likewise have interval between packets and any ACKs 1106 input that reflects no ACKs, which may indicate possible UDP traffic due to low latency. Accordingly, the associated category classification 1108 category is category '1,' no multi-link redundancy, and the associated channel redundancy 1110 classification is "none."

As another example, the seamless connectivity handover use case 1102 of wireless docking may have interval between packet bursts 1104 input that is sporadic and correlated to user activity, which can likely be correlated on the platforms side. The seamless connectivity handover use case 1102 of wireless docking may likewise have interval between packets and any ACKs 1106 input that reflects low latency between requests and responses. Accordingly, the associated category classification 1108 category is category '2,' multi-links that are redundant, and the associated channel redundancy 1110 classification is a choice of real-time redundancy methods, as a function of packet loss.

As yet another example, the seamless connectivity handover use case 1102 of P2P control operations may have interval between packet bursts 1104 input that is sporadic and correlated to user activity, which can likely be correlated on the platforms side. The seamless connectivity handover use case 1102 of wireless docking may likewise have interval between packets and any ACKs 1106 input that reflects moderate latency between requests and responses. Accordingly, the associated category classification 1108 category is category '3,' multi-links that are redundant, and the associated channel redundancy 1110 classification is robust delayed real-time variable channel redundancy methods, as a function of packet loss. Those of skill in the art will recognize that many such examples are possible. Accordingly, the foregoing is not intended to limit the spirit, scope, or intent of the invention.

Figure 12A:
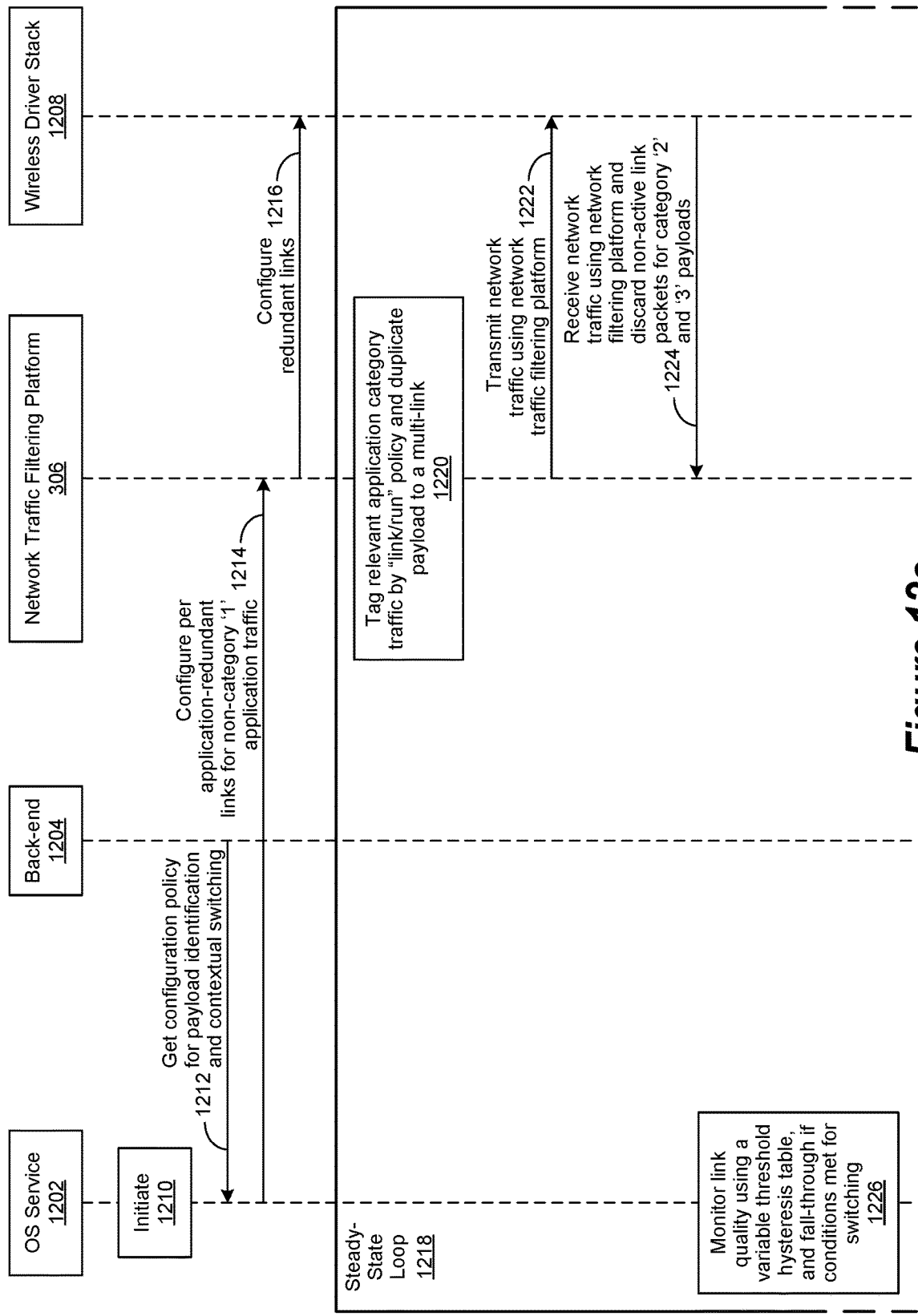
FIGS. 12a and 12b show process flows associated with the performance of seamless connectivity handover operations.
Figure 12B:
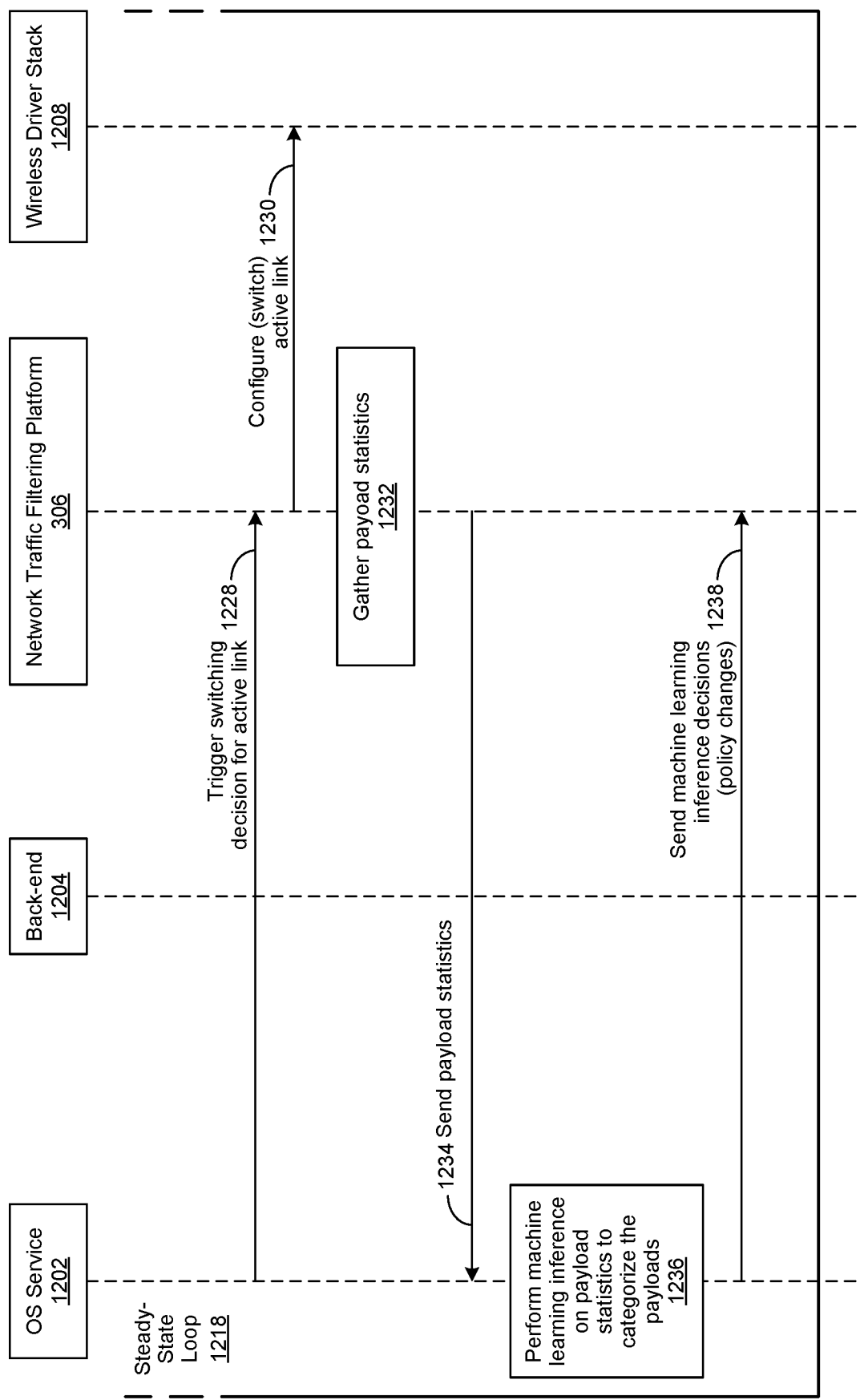

FIGS. 12a and 12b show process flows associated with the performance of seamless connectivity handover operations implemented in accordance with an embodiment of the invention. In this embodiment, seamless connectivity handover operations are initiated in step 1210 by an operating system (OS) service 120e executing on an associated endpoint device. Then, in step 1212, a configuration policy, described in greater detail herein, is retrieved to identify the user device context and associated payload type. A network traffic filtering platform 306, described in greater detail herein, is then used in step 1214 to configure application-redundant links for non-category '1' application traffic, likewise described in greater detail herein. In turn, a wireless driver stack 1208 is then used in step 1216 to configure the application-redundant links.

Ongoing steady-state loop operations 1218 are then initiated by the network traffic filtering platform 306 being used to tag relevant application category traffic, described in greater detail herein, by "link/run" policy and duplicate payload to a particular multi-link. The wireless driver stack 1208 is then used to use in combination with a network traffic filtering platform, described in greater detail herein, in step 1222 to transmit network traffic over the multi-link. The wireless driver stack 1208 is likewise used in combination with the network traffic filtering platform in step 1224 to receive network traffic and discard non-active network link packets for category '2' and '3' payloads.

Then, in step 1228, ongoing operations are performed by the OS service 1202 to monitor network link quality using a variable threshold hysteresis table, and fall-through if conditions are met for switching network links. The network traffic filtering platform 306 is then used in step 1228 to trigger a switching decision for a particular active link. In turn, the wireless driver stack 1208 is then used in step 1230 to configure, and switch, to the active link. Payload statistics are then gathered in step 1232 by the network traffic filtering platform 306 and sent to the OS service 1202 in step 1234. Machine learning inference is then performed in step 1236 by the OS service 1202 to categorize the payloads, which are then sent by the OS service 1202 in step 1238, along with any associated policy changes, to the network traffic filtering platform 306.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a connectivity handover operation, comprising:
   collecting information associated with a context of a user device;
   receiving a plurality of location network tags, each of the plurality of location network tags comprising a collection of location and operational information describing a physical location of a network link and associated characteristics of the physical location;
   identifying a Wireless Wide Area Network (WWAN) link, the WWAN link having an associated WWAN location quality identifier;
   identifying a Wireless Local Area Network (WLAN) link, the WLAN link having an associated WLAN location quality identifier;
   monitoring the associated WWAN location quality identifier, the associated WLAN location quality indicator and at least one of the plurality of location network tags;
   determining whether the WWAN link should be activated based upon the associated WLAN location quality identifier, the at least one of the plurality of location network tags and the information associated with the context of the user device; and,
   performing the connectivity handover operation on the user device based upon the determining.

2. The method of claim 1, further comprising:
   performing a post-handover management operation, the post-handover management operation monitoring the associated WWAN location quality indicator and the associated WLAN location quality indicator and adjusting network traffic assigned to the WWAN and the WLAN based upon the associated WWAN location quality indicator and the associated WLAN location quality indicator.

3. The method of claim 1, wherein:
   the connectivity handover operation provides multi-link redundancy.

4. The method of claim 1, wherein:
   the associated WWAN location quality identifier includes at least one of a Quality of service (QoS) metric and a link quality metric; and,
   the associated WLAN location quality identifier includes at least one of a Quality of service (QoS) metric and a link quality metric.

5. The method of claim 1, further comprising:
   collecting a user device context; and,
   using the user device context when determining whether the WWAN link should be activated.

6. The method of claim 1, wherein:
   a user device is coupled to a wireless dock; and,
   the wireless dock communicates with at least one of the WWAN link and the WLAN link.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   collecting information associated with a context of a user device;
   receiving a plurality of location network tags, each of the plurality of location network tags comprising a collection of location and operational information describing a physical location of a network link and associated characteristics of the physical location;

identifying a Wireless Wide Area Network (WWAN) link, the WWAN link having an associated WWAN location quality identifier;

identifying a Wireless Local Area Network (WLAN) link, the WLAN link having an associated WLAN location quality identifier;

monitoring the associated WWAN location quality identifier, the associated WLAN location quality indicator and at least one of the plurality of location network tags;

determining whether the WWAN link should be activated based upon the associated WLAN location quality identifier, the at least one of the plurality of location network tags and the information associated with the context of the user device; and, performing the connectivity handover operation on the user device based upon the determining.

8. The system of claim 7, wherein the instructions executable by the processor are further configured for:

performing a post-handover management operation, the post-handover management operation monitoring the associated WWAN location quality indicator and the associated WLAN location quality indicator and adjusting network traffic assigned to the WWAN and the WLAN based upon the associated WWAN location quality indicator and the associated WLAN location quality indicator.

9. The system of claim 7, wherein:

the connectivity handover operation provides multi-link redundancy.

10. The system of claim 7, wherein:

the associated WWAN location quality identifier includes at least one of a Quality of service (QoS) metric and a link quality metric; and, the associated WLAN location quality identifier includes at least one of a Quality of service (QoS) metric and a link quality metric.

11. The system of claim 7, wherein the instructions executable by the processor are further configured for:

collecting a user device context; and, using the user device context when determining whether the WWAN link should be activated.

12. The system of claim 7, wherein:

a user device is coupled to a wireless dock; and, the wireless dock communicates with at least one of the WWAN link and the WLAN link.

13. A non-transitory, computer-readable storage medium embodying computer program code, the computer program code comprising computer executable instructions configured for:

collecting information associated with a context of a user device;

receiving a plurality of location network tags, each of the plurality of location network tags comprising a collection of location and operational information describing a physical location of a network link and associated characteristics of the physical location;

identifying a Wireless Wide Area Network (WWAN) link, the WWAN link having an associated WWAN location quality identifier;

identifying a Wireless Local Area Network (WLAN) link, the WLAN link having an associated WLAN location quality identifier;

monitoring the associated WWAN location quality identifier, the associated WLAN location quality indicator and at least one of the plurality of location network tags;

determining whether the WWAN link should be activated based upon the associated WLAN location quality identifier, the at least one of the plurality of location network tags and the information associated with the context of the user device; and, performing the connectivity handover operation on the user device based upon the determining.

14. The non-transitory, computer-readable storage medium of claim 13, wherein the computer executable instructions are further configured for:

performing a post-handover management operation, the post-handover management operation monitoring the associated WWAN location quality indicator and the associated WLAN location quality indicator and adjusting network traffic assigned to the WWAN and the WLAN based upon the associated WWAN location quality indicator and the associated WLAN location quality indicator.

15. The non-transitory, computer-readable storage medium of claim 13, wherein:

the connectivity handover operation provides multi-link redundancy.

16. The non-transitory, computer-readable storage medium of claim 13, wherein:

the associated WWAN location quality identifier includes at least one of a Quality of service (QoS) metric and a link quality metric; and, the associated WLAN location quality identifier includes at least one of a Quality of service (QoS) metric and a link quality metric.

17. The non-transitory, computer-readable storage medium of claim 13, wherein the computer executable instructions are further configured for:

collecting a user device context; and, using the user device context when determining whether the WWAN link should be activated.

18. The non-transitory, computer-readable storage medium of claim 13, wherein:

a user device is coupled to a wireless dock; and, the wireless dock communicates with at least one of the WWAN link and the WLAN link.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *